US012640680B2

(12) United States Patent
Zhang et al.

(10) Patent No.: US 12,640,680 B2
(45) Date of Patent: May 26, 2026

(54) PHOTOVOLTAIC POWER GENERATION SYSTEM

(71) Applicant: Huawei Digital Power Technologies Co., Ltd., Shenzhen (CN)

(72) Inventors: Yanzhong Zhang, Shenzhen (CN); Zhiwu Xu, Shenzhen (CN); Chongyue Huang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 185 days.

(21) Appl. No.: 18/520,763

(22) Filed: Nov. 28, 2023

(65) Prior Publication Data

US 2024/0097615 A1 Mar. 21, 2024

Related U.S. Application Data

(63) Continuation of application No. PCT/CN2021/098178, filed on Jun. 3, 2021.

(51) Int. Cl.
| | |
|---|---|
| *H02S 40/32* | (2014.01) |
| *H02J 3/38* | (2026.01) |
| *H02S 10/00* | (2014.01) |
| *H02J 101/24* | (2026.01) |

(52) U.S. Cl.
CPC ............... *H02S 40/32* (2014.12); *H02J 3/38* (2013.01); *H02S 10/00* (2013.01); *H02J 2101/24* (2026.01)

(58) Field of Classification Search
None
See application file for complete search history.

(56) References Cited

U.S. PATENT DOCUMENTS

2012/0175963 A1* 7/2012 Adest ..................... H02J 1/102
307/82

FOREIGN PATENT DOCUMENTS

CN 209120129 U * 7/2019

OTHER PUBLICATIONS

Machine translation of CN209120129 (Year: 2019).*

* cited by examiner

*Primary Examiner* — Ryan S Cannon
(74) *Attorney, Agent, or Firm* — Maier & Maier, PLLC

(57) ABSTRACT

A photovoltaic power generation system includes a single-stage inverter, an anti-backflow circuit, a photovoltaic string, and a coupling capacitor. The anti-backflow circuit is connected to one input end of the single-stage inverter, one output end of the photovoltaic string is connected to the other input end of the single-stage inverter, and the other output end of the photovoltaic string is connected to the anti-backflow circuit. The photovoltaic string includes a buck optimizer and a photovoltaic panel. The anti-backflow circuit is configured to prevent a backflow current from flowing back to the photovoltaic string. The coupling capacitor is connected in parallel to two ends of the anti-backflow circuit and is configured to transmit a signal between each buck optimizer in the photovoltaic string and the single-stage inverter, to control backflow of the backflow current when the anti-backflow circuit fails.

20 Claims, 9 Drawing Sheets

(a)

(b)

PHOTOVOLTAIC POWER GENERATION SYSTEM

CROSS-REFERENCE TO RELATED APPLICATIONS

This application is a continuation of International Application No. PCT/CN2021/098178, filed on Jun. 3, 2021, the disclosure of which is hereby incorporated by reference in its entirety.

TECHNICAL FIELD

The embodiments relate to the field of photovoltaic power generation and a photovoltaic power generation system.

BACKGROUND

With continuous development of science and technology, a photovoltaic power generation system has also developed rapidly. With reduction of costs of photovoltaic panels, increasingly more grid-connected photovoltaic power generation systems emerge. In a current photovoltaic power generation system, a boost circuit, a buck circuit, and a direct current (DC)/alternating current (AC) inversion circuit may be used to adjust and control a voltage output by a photovoltaic panel.

However, in some cases, current backflow may occur and damage the photovoltaic panel. How to suppress backflow of a backflow current to effectively protect the photovoltaic panel is an urgent problem to be resolved.

SUMMARY

The embodiments provide a photovoltaic power generation system, to effectively protect a photovoltaic panel and prolong a service life of the photovoltaic panel.

According to a first aspect, the embodiments provide a photovoltaic power generation system, including a single-stage inverter, at least one anti-backflow circuit, at least one photovoltaic string, and a coupling capacitor. Each of the at least one anti-backflow circuit is connected to one input end of the single-stage inverter, one output end of each of the at least one photovoltaic string is connected to the other input end of the single-stage inverter, and the other output end of each photovoltaic string is connected to one anti-backflow circuit. Each photovoltaic string includes a plurality of photovoltaic string units, each of the plurality of photovoltaic string units includes a buck optimizer and one or more photovoltaic panels connected in parallel to the buck optimizer, and the buck optimizer is configured to perform buck processing on an output voltage or output voltages of the connected one or more photovoltaic panels. The single-stage inverter is connected to a power grid and is configured to: convert a direct-current voltage from the photovoltaic string into an alternating-current voltage and transfer the alternating-current voltage to the power grid. The anti-backflow circuit is configured to prevent a backflow current from flowing back to one or more of the at least one photovoltaic string. The backflow current includes a current generated when a bus voltage is greater than an open-circuit voltage of the at least one photovoltaic string, and/or a current generated when the photovoltaic power generation system includes a plurality of photovoltaic strings and open-circuit voltages of the plurality of photovoltaic strings are different. The coupling capacitor is connected in parallel to two ends of the anti-backflow circuit and is configured to transmit a signal between each buck optimizer in the at least one photovoltaic string and the single-stage inverter, to control backflow of the backflow current when the anti-backflow circuit fails.

In comparison with a photovoltaic power generation system in a conventional technology that uses a structure of a buck/boost optimizer and a single-stage inverter or a structure of a buck/boost optimizer and a dual-stage inverter, in the photovoltaic power generation system including the buck optimizer, the single-stage inverter, and the anti-backflow circuit, one stage of DC/DC converter is reduced, and therefore, a structure is simple, and costs are low. In addition, because the anti-backflow circuit has a failure probability, when the anti-backflow circuit fails, the coupling capacitor is configured to transmit a signal between the buck optimizer and the single-stage inverter to control backflow of the backflow current, so that the backflow current decreases or disappears, thereby forming dual protection for the photovoltaic string and significantly improving reliability of power control.

With reference to the first aspect, in some possible implementations of the first aspect, a first buck optimizer in a first photovoltaic string in the plurality of photovoltaic strings is configured to send a first power line communication (PLC) signal to the single-stage inverter when detecting a backflow current that is greater than or equal to a first preset threshold. The first PLC signal carries a value of the backflow current, the first photovoltaic string is one or more photovoltaic strings in the at least one photovoltaic string, and the first buck optimizer is any buck optimizer in the first photovoltaic string. The single-stage inverter is further configured to reduce the bus voltage when receiving the first PLC signal.

Because the anti-backflow circuit has a failure probability, the backflow current is detected by using the buck optimizer, and when the anti-backflow circuit fails, a PLC signal is sent to the single-stage inverter, to trigger the single-stage inverter to reduce the bus voltage, so that the backflow current decreases or disappears, thereby forming dual protection for the photovoltaic string and significantly improving reliability of power control.

With reference to the first aspect, in some possible implementations of the first aspect, the single-stage inverter is further configured to turn off the single-stage inverter when the bus voltage is reduced to a second preset threshold, but the backflow current is still greater than or equal to the first preset threshold.

When the single-stage inverter cannot reduce the bus voltage to make the backflow current less than the first preset threshold, the single-stage inverter may be shut down, so that the backflow current disappears, and the photovoltaic panel is protected from being damaged by the backflow current.

With reference to the first aspect, in some possible implementations of the first aspect, the photovoltaic power generation system further includes a second photovoltaic string, and the single-stage inverter is further configured to: before turning off the single-stage inverter, send a second PLC signal to a buck optimizer in the second photovoltaic string when the bus voltage is reduced to a second preset threshold but the backflow current is still greater than or equal to the first preset threshold. The second PLC signal carries an output voltage reduction instruction, a second buck optimizer in the second photovoltaic string is configured to reduce an output voltage or turn off the second buck optimizer when receiving the second PLC signal, and the second buck optimizer is any buck optimizer in the second photovoltaic string.

When the single-stage inverter reduces the bus voltage or is shut down, the backflow current is still greater than or equal to the first preset threshold, and there are two or more photovoltaic strings in the photovoltaic system, the single-stage inverter may send a PLC signal to an optimizer in another photovoltaic string, to control the optimizer in the another photovoltaic string to reduce an output voltage or enable the optimizer to be in a shutdown state, so that the backflow current is less than the first preset threshold, to protect the photovoltaic string from being damaged by the backflow current.

With reference to the first aspect, in some possible implementations of the first aspect, a transmission path includes a coupling capacitor connected in parallel to two ends of the anti-backflow circuit.

The coupling capacitor is connected in parallel to the two ends of the anti-backflow circuit, so that the coupling capacitor is used as a signal path of the PLC signal.

With reference to the first aspect, in some possible implementations of the first aspect, the buck optimizer further includes a first PLC control unit and a first PLC coupling transformer, the first PLC control unit is configured to generate a communication signal, and the first PLC coupling transformer is configured to couple the communication signal to a power line, or the first PLC coupling transformer is configured to extract the communication signal from the power line and send the communication signal to the first PLC control unit.

The first PLC control unit and the first PLC coupling transformer are used to ensure compatibility between the communication signal and a power signal, to implement communication between the buck optimizer and the single-stage inverter.

With reference to the first aspect, in some possible implementations of the first aspect, the buck optimizer further includes a second PLC control unit and a second PLC coupling transformer, the second PLC control unit is configured to generate a communication signal, and the second PLC coupling transformer is configured to couple the communication signal to a power line, or the second PLC coupling transformer is configured to extract the communication signal from the power line and send the communication signal to the second PLC control unit.

The second PLC control unit and the second PLC coupling transformer are used to ensure compatibility between the communication signal and a power signal, to implement communication between the buck optimizer and the single-stage inverter.

With reference to the first aspect, in some possible implementations of the first aspect, each of the at least one anti-backflow circuit is connected in series to one of the at least one photovoltaic string to form a branch circuit, and at least one branch circuit including the at least one anti-backflow circuit and the at least one photovoltaic string is connected in parallel to the single-stage inverter.

One photovoltaic string is connected in series to one anti-backflow circuit to form a single branch circuit, and then the single branch circuit is connected in parallel to the single-stage inverter, so that not only a current can be prevented from flowing back from the single-stage inverter to the photovoltaic string, but a current of a photovoltaic string of another branch circuit can also be prevented from flowing back to the photovoltaic string, thereby protecting the photovoltaic string and avoiding damage to the photovoltaic string.

With reference to the first aspect, in some possible implementations of the first aspect, a first anti-backflow circuit in the at least one anti-backflow circuit is connected to a plurality of photovoltaic strings, the plurality of photovoltaic strings are connected in parallel, one output end of the plurality of photovoltaic strings is connected to the first anti-backflow circuit, and the other output end of the plurality of photovoltaic strings is connected to the single-stage inverter.

With reference to the first aspect, in some possible implementations of the first aspect, a positive electrode of each of the at least one photovoltaic string is connected to one anti-backflow circuit, and a negative electrode is connected to the single-stage inverter; or a negative electrode of each of the at least one photovoltaic string is connected to one anti-backflow circuit, and a positive electrode is connected to the single-stage inverter.

The anti-backflow circuit is added between the photovoltaic string and the inverter, so that in one aspect, current backflow can be prevented, and the photovoltaic string can be protected, thereby avoiding damage to the photovoltaic string, and in another aspect, a system structure is simplified.

With reference to the first aspect, in some possible implementations of the first aspect, the anti-backflow circuit includes an anti-backflow diode, a fuse, or an electronic switch.

DETAILED DESCRIPTION OF EMBODIMENTS

Figure 1:
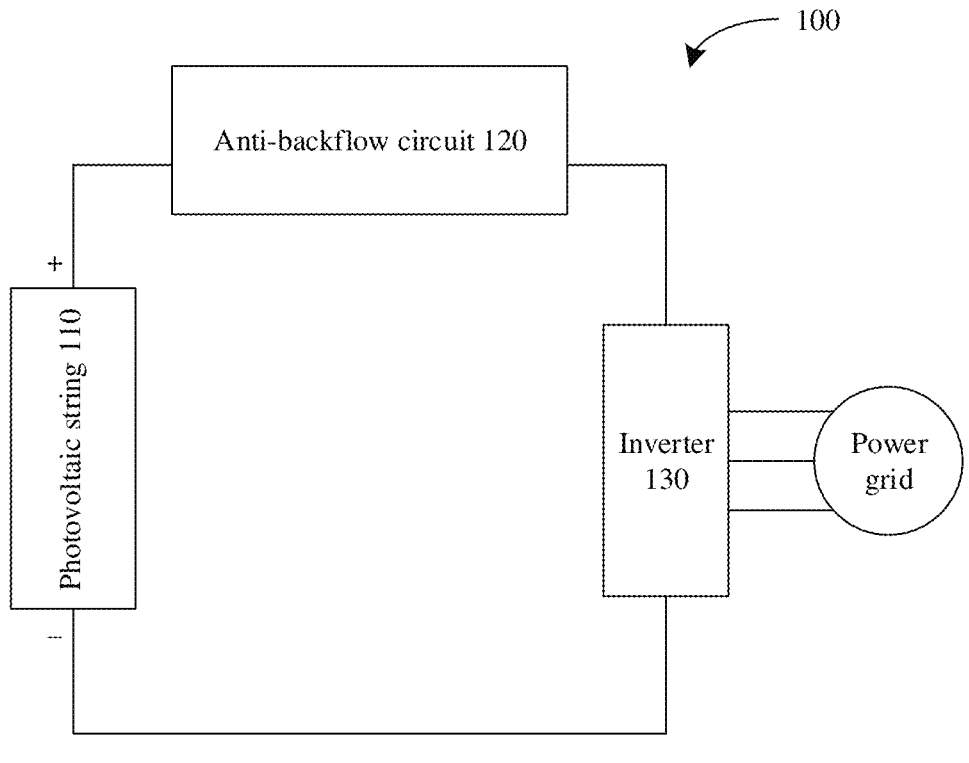
FIG. 1 is a schematic diagram of a photovoltaic power generation system according to an embodiment.

The following describes the embodiments with reference to accompanying drawings.

A photovoltaic power generation system provided in the embodiments may be used in a distributed energy system, a microgrid, and a power station. The distributed energy system may be, for example, a distributed optical storage system, a distributed wind storage system, or a distributed comprehensive energy system. The power station may be, for example, a new energy power station such as a solar storage power station or a wind storage power station, or a comprehensive energy power station.

For ease of understanding of the embodiments, the following descriptions are first provided:

First, terms such as "first," "second," and the like in the embodiments are used to distinguish between similar objects, and do not need to be used to describe an order or sequence. It should be understood that data used in such a way can be exchanged in proper situations, so that embodiments described herein can be implemented in sequences other than content illustrated or described herein.

Second, a circuit structure of a photovoltaic power generation system shown in the following descriptions with reference to a plurality of accompanying drawings is merely an example. Based on a same concept, a person skilled in the art may further make simple variations or equivalent replacements to a circuit structure of each part in the figure, to implement a function that is the same as or similar to the circuit structure provided in the embodiments. These simple variations or equivalent replacements shall fall within the protection scope of the embodiments.

Third, in the embodiments, "at least one" may represent one or more. A "plurality of" means two or more.

For ease of understanding, structures and functions of components in the embodiments are described first.

1. A photovoltaic (PV) panel may also be referred to as a solar module or a photovoltaic module, and several single cells are connected in series and/or connected in parallel and are tightly packaged into a component.

2. A photovoltaic string includes a plurality of photovoltaic modules and a plurality of optimizers. An input end of each optimizer is connected to one or more photovoltaic panels. This may also be understood as that one or more photovoltaic panels are connected in parallel to one optimizer. When a plurality of photovoltaic panels is connected in parallel to the optimizer, the plurality of photovoltaic panels may be connected in series, or may be connected in parallel, or a plurality of groups of photovoltaic panels connected in series may be connected in parallel. This is not limited in the embodiments.

For ease of description, each optimizer and one or more photovoltaic panels connected to the optimizer are referred to as one photovoltaic string unit herein. In other words, the photovoltaic string includes a plurality of photovoltaic string units. An output end of the photovoltaic string may be connected to an inverter, to output a voltage to the inverter.

In the embodiments, the optimizer connected to the photovoltaic module may be a buck optimizer. The inverter connected to the photovoltaic string may be a single-stage inverter.

A photovoltaic power generation system is described below with reference to the accompanying drawings.

FIG. 1 is a schematic diagram of a photovoltaic power generation system.

As shown in FIG. 1, a photovoltaic power generation system 100 includes a photovoltaic string 110, an anti-backflow circuit 120, and a single-stage inverter 130. There may be one or more photovoltaic strings 110. There may also be one or more anti-backflow circuits 120. FIG. 1 is merely an example, and shows one photovoltaic string 110, one anti-backflow circuit 120, and one single-stage inverter 130. However, this shall not constitute any limitation on this embodiment.

Each anti-backflow circuit 120 may be connected to one input end of the single-stage inverter 130, one output end of each photovoltaic string 110 may be connected to the other input end of the single-stage inverter, and the other output end of each photovoltaic string 110 may be connected to one anti-backflow circuit 120 and is connected to one input end of the single-stage inverter 130 by using the anti-backflow circuit 120. An output end of the single-stage inverter 130 is connected to a power grid.

Each photovoltaic string 110 includes a plurality of photovoltaic string units, and each photovoltaic string unit includes a buck optimizer and one or more photovoltaic panels connected to the buck optimizer. For a connection relationship between the buck optimizer and the photovoltaic panel in the photovoltaic string unit, refer to the foregoing related descriptions of the photovoltaic string. For brevity, details are not described herein again.

It should be understood that FIG. 1 shows only a form in which a positive output end of the photovoltaic string is connected to a positive input end of the single-stage inverter by connecting in series to the anti-backflow circuit. The anti-backflow circuit may alternatively be connected in series to a negative output end of the photovoltaic string. This is not limited in this embodiment.

Each of the at least one anti-backflow circuit is connected in series to one of the at least one photovoltaic string, and the anti-backflow circuit and the photovoltaic string that are connected in series form a branch circuit. The at least one anti-backflow circuit and the at least one photovoltaic string may form at least one branch circuit, and the at least one branch circuit may be connected in parallel to the single-stage inverter. For details of the photovoltaic power generation system 100, refer to FIG. 2 and FIG. 6 to FIG. 8.

One or more anti-backflow circuits in the at least one anti-backflow circuit are connected to a plurality of photovoltaic strings connected in parallel. An anti-backflow circuit connected to the plurality of photovoltaic strings connected in parallel is denoted as a first anti-backflow circuit. Positive electrodes of the plurality of photovoltaic strings connected in parallel may be connected to the first anti-backflow circuit, and negative electrodes of the plurality of photovoltaic strings connected in parallel may be connected to the single-stage inverter. For details of the photovoltaic power generation system 100, refer to FIG. 9 and FIG. 10.

It can be understood that, for each photovoltaic string unit, an input voltage of each optimizer is provided by one or more photovoltaic panels connected to the optimizer. An output voltage of the photovoltaic string may be provided by a plurality of photovoltaic string units.

Each buck optimizer may be configured to control voltages and currents that are output by one or more photovoltaic panels connected to the buck optimizer, for example, perform buck processing, to input a voltage obtained after bucking to the inverter. In addition, the buck optimizer also has a maximum power point tracking (MPPT) function. In this embodiment, because each buck optimizer has the MPPT function, each photovoltaic string unit can implement MPPT.

It should be understood that the MPPT function may be implemented by using a mountain climbing method in a conventional technology. For brevity, details are not described herein.

A voltage that is input to the single-stage inverter is a direct-current voltage. The single-stage inverter may be configured to convert the direct-current voltage into an alternating-current voltage and input the alternating-current voltage into the power grid.

The anti-backflow circuit 120 connected in series between the buck optimizer and the single-stage inverter may be configured to prevent current backflow, to protect the photovoltaic string.

It should be noted that a structure of a buck/boost optimizer and a single-stage inverter or a structure of a buck optimizer and a dual-stage inverter may be used in an existing photovoltaic power generation system. Such a circuit structure may include two-stage DC-DC conversion, that is, a buck circuit, a boost circuit, and one-stage DC-AC conversion. The boost circuit includes an anti-backflow circuit, but a structure of the buck optimizer+the single-stage inverter may not include the boost circuit. Therefore, one anti-backflow circuit needs to be additionally added, to prevent a large current from flowing back to the photovoltaic string and causing damage to the photovoltaic string.

It should be understood that the anti-backflow circuit may exist in the circuit as an independent component, as shown in FIG. 1, or may be integrated into the single-stage inverter or the buck optimizer. This is not limited in this embodiment. It should be further understood that, if the anti-backflow circuit is integrated into the single-stage inverter or the buck optimizer, a connection manner of the anti-back-flow circuit and another circuit is the same as a connection manner used when the anti-backflow circuit exists in the circuit as an independent component. The anti-backflow circuit may be connected in series to the single-stage inverter or the buck optimizer in both connection manners. Therefore, in the photovoltaic power generation system provided in this embodiment, a photovoltaic string including the photovoltaic panel and the buck optimizer is used together with the single-stage inverter, and a boost circuit is canceled. Compared with another photovoltaic power generation system in a conventional technology, one-stage of DC/DC conversion is reduced, and therefore, a structure is simple, and costs are low. In addition, the photovoltaic module is connected to an optimizer with the MPPT function to implement component-level maximum power tracking and convert an input voltage/current into different output voltages/currents, so that system efficiency is improved to maximum extent.

A reason why the boost circuit can be canceled is that, in one aspect, sufficient photovoltaic modules are connected in series, and each photovoltaic module shares a low voltage, and therefore, when a small part of photovoltaic panels cannot work normally, an overall output voltage is not affected significantly; and in another aspect, because the buck optimizer has the MPPT function, when some photovoltaic modules cannot work normally, an output voltage and an output current of another photovoltaic module may be adjusted, to ensure that an overall voltage of the photovoltaic string keeps stable. Therefore, although the boost circuit is not used in the photovoltaic power generation system provided in this embodiment, a stable voltage can also be output, to achieve good system efficiency.

In addition, the anti-backflow circuit is added between the photovoltaic string and the single-stage inverter, so that current backflow can be prevented, and a current flowing through the photovoltaic string does not exceed a maximum current allowed by the string, and therefore, the photovoltaic string is protected, and damage to the photovoltaic string can be prevented.

Herein, the backflow current may be generated in at least one of the following cases: The bus voltage is greater than an open-circuit voltage of the at least one photovoltaic string, or the photovoltaic power generation system includes a plurality of photovoltaic strings and open-circuit voltages of the plurality of photovoltaic strings are different. The bus voltage may be a voltage at a common connection point of the at least one photovoltaic string, that is, a voltage at the input end of the single-stage inverter in the photovoltaic power generation system.

In other words, the backflow current may include a current generated when the bus voltage is greater than the open-circuit voltage of the at least one photovoltaic string, and/or a current generated when the photovoltaic power generation system includes a plurality of photovoltaic strings and open-circuit voltages of the plurality of photovoltaic strings are different.

It may be understood that, if there is one photovoltaic string in the photovoltaic power generation system, the backflow current is generated because the bus voltage is greater than the open-circuit voltage of the photovoltaic string.

Because the anti-backflow circuit has a failure probability, if the anti-backflow circuit fails, the backflow current may flow back. Therefore, to protect the photovoltaic module from being damaged by the backflow current, the photovoltaic power generation system provided in this embodiment has a function of dual protection for the photovoltaic string. In other words, when the anti-backflow circuit fails, the photovoltaic power generation system provided in this embodiment enables the function of dual protection for the photovoltaic string. An implementation process of the function of dual protection for the photovoltaic string is described below.

For ease of description, a photovoltaic power generation system including only one photovoltaic string is used as an example for description first, and the photovoltaic string is denoted as, for example, a first photovoltaic string. If the bus voltage is greater than the open-circuit voltage, any buck optimizer in the first photovoltaic string may detect the backflow current. For ease of description, an example in which a first buck optimizer in the first photovoltaic string detects the backflow current is used below for description. The first buck optimizer may be any buck optimizer in the first photovoltaic string. In other words, any buck optimizer in the first photovoltaic string may perform operations described below.

When detecting a backflow current that is greater than or equal to a first preset threshold, the first buck optimizer may send a first PLC signal to the single-stage inverter, and the first PLC signal carries a backflow current value. The single-stage inverter may reduce the bus voltage when receiving the first PLC signal.

It should be understood that current backflow is generated because the bus voltage is greater than an open-circuit voltage of the first photovoltaic string, and therefore, when the bus voltage is reduced, the backflow current can be reduced or even be reduced to zero, so that the backflow current can be suppressed, and damage caused by the backflow current to the photovoltaic panel can be reduced.

It should be further understood that, when the photovoltaic power generation system includes a plurality of photovoltaic strings, one or more first photovoltaic strings may detect the backflow current whose value is greater than or equal to the first preset threshold. Any buck optimizer in the first photovoltaic string may send, to the single-stage inverter, the first PLC signal that carries the backflow current value, to trigger the single-stage inverter to reduce the bus voltage.

However, based on different power grids, an input voltage of a corresponding single-stage inverter needs to be controlled within a preset range. Therefore, the inverter cannot reduce the bus voltage without limitation; in other words, the bus voltage cannot be lower than a minimum value of the preset range. For brevity, the minimum value of the preset range is referred to as a second preset threshold below.

If the bus voltage is reduced to the second preset threshold, but the backflow current is still greater than or equal to the first preset threshold, the backflow current may be further suppressed in another manner.

If the photovoltaic power generation system includes only one photovoltaic string, the photovoltaic string is the first photovoltaic string. In a photovoltaic power generation system shown in FIG. 2 and FIG. 6, a photovoltaic string 110 is an example of the first photovoltaic string. As described above, the backflow current is caused because the bus voltage is greater than the open-circuit voltage of the first photovoltaic string. In this case, when the bus voltage is reduced to the second preset threshold, but the backflow current is still greater than or equal to the first preset threshold, the single-stage inverter may be turned off, so that the backflow current decreases or disappears.

If the photovoltaic power generation system includes a plurality of photovoltaic strings, the plurality of photovoltaic strings is connected in parallel to the single-stage inverter. For example, the photovoltaic power generation system includes a first photovoltaic string and a second photovoltaic string. The first photovoltaic string may be one or more photovoltaic strings that detect the backflow current that is greater than or equal to the first preset threshold, and the second photovoltaic string may be one or more photovoltaic strings that detect no backflow current or that detect a backflow current whose value is less than the first preset threshold. With reference to a photovoltaic power generation system shown in FIG. 7 to FIG. 9, a photovoltaic string 111 is an example of the first photovoltaic string, and a photovoltaic string 112 is an example of the second photovoltaic string. With reference to a photovoltaic power generation system shown in FIG. 10, for example, when there is the backflow current in the photovoltaic string 111, and there is no backflow current in other two photovoltaic strings 1121 and 1122, the photovoltaic string 111 is an example of the first photovoltaic string, and the photovoltaic strings 1121 and 1122 are examples of the second photovoltaic string. Based on a same principle, the photovoltaic strings 111 and 1121 may be other examples of the first photovoltaic string, and the photovoltaic string 1122 may be another example of the second photovoltaic string. For brevity, photovoltaic strings are not listed herein.

As described above, in one aspect, the backflow current may be caused because the bus voltage is greater than the open-circuit voltage of the first photovoltaic string, and in another aspect, the backflow current may be caused because an open-circuit voltage of another photovoltaic string (for example, the second photovoltaic string) is greater than the open-circuit voltage of the first photovoltaic string. When the bus voltage is reduced to the second preset threshold, but the backflow current in the first photovoltaic string is still greater than or equal to the first preset threshold, the single-stage inverter may send a second PLC signal to a buck optimizer in the second photovoltaic string. The second PLC signal includes an instruction for enabling the buck optimizer to reduce an output voltage. For example, the instruction may include a voltage value that needs to be reduced by the buck optimizer. When receiving the second PLC signal, the buck optimizer in the second photovoltaic string reduces the output voltage or sets the buck optimizer in the second photovoltaic string to a shutdown state.

The single-stage inverter may determine, based on closed-loop control and a backflow current value I received from the buck optimizer, the voltage value that needs to be reduced by the buck optimizer. The single-stage inverter may obtain, based on a proportional, integral, and differential (PID) algorithm, a relationship between the voltage value $\Delta U$ that needs to be reduced and the backflow current value I as follows: $\Delta U=(k_p+k_i/s+k_ds)\times I$. $k_p$ represents a controller proportional term, $k_i/s$ represents a controller integral term, and $k_ds$ represents a controller differential term. For parameters in the formula, refer to related descriptions of a PID algorithm in the conventional technology. For brevity, details are not described herein.

It should be understood that a method used by the single-stage inverter to determine the voltage value that needs to be reduced is not limited to the foregoing formula. An implementation of determining, by the single-stage inverter, the voltage value that needs to be reduced is not limited.

It should be further understood that there may be one or more second photovoltaic strings. For ease of description, the buck optimizer in the second photovoltaic string is denoted as a second buck optimizer. The second buck optimizer may reduce the output voltage or the second buck optimizer is turned off when the second PLC signal is received. When the second buck optimizer reduces a voltage, the first buck optimizer may continuously send the first PLC signal to the single-stage inverter, to feed back a latest detected backflow current value to the single-stage inverter. For example, the first buck optimizer may periodically send the first PLC signal. Alternatively, the single-stage inverter may adjust, based on a latest received first PLC signal, a voltage value that needs to be reduced by the second photovoltaic string, and continuously send the second PLC signal to the second buck optimizer. For example, the single-stage inverter may alternatively periodically send the second PLC signal until the backflow current value detected by the first buck optimizer is less than the first preset threshold, and the first buck optimizer stops sending the first PLC signal to the single-stage inverter. In this way, the single-stage inverter adjusts, in real time based on the backflow current value detected by the first buck optimizer, the voltage value that needs to be reduced, to form closed-loop control.

It should be further understood that, for a connection relationship between constituent parts of each circuit in the function of dual protection for the photovoltaic string and functions of the parts, refer to related descriptions below with reference to a plurality of accompanying drawings. Details are not described herein.

Based on the foregoing function of dual protection for the photovoltaic string, when the anti-backflow circuit fails and the buck optimizer detects the backflow current, the buck optimizer may send a PLC signal to the single-stage inverter, so that the single-stage inverter reduces the bus voltage. In this way, the backflow current decreases or disappears, to form dual protection for the photovoltaic string. Further, when the single-stage inverter cannot reduce the bus voltage to make the backflow current less than the first preset threshold, the single-stage inverter may be shut down, so that the backflow current disappears, and the photovoltaic panel is protected from being damaged by the backflow current. Still further, when the single-stage inverter reduces the bus voltage or is shut down, the backflow current is still greater than or equal to the first preset threshold, and there are two or more photovoltaic strings in the photovoltaic system, the single-stage inverter may send a PLC signal to an optimizer in another photovoltaic string, to control the optimizer in the another photovoltaic string to reduce an output voltage or enable the optimizer to be in a shutdown state, so that the backflow current is less than the first preset threshold, to protect a photovoltaic module from being damaged by the backflow current.

Figure 2:
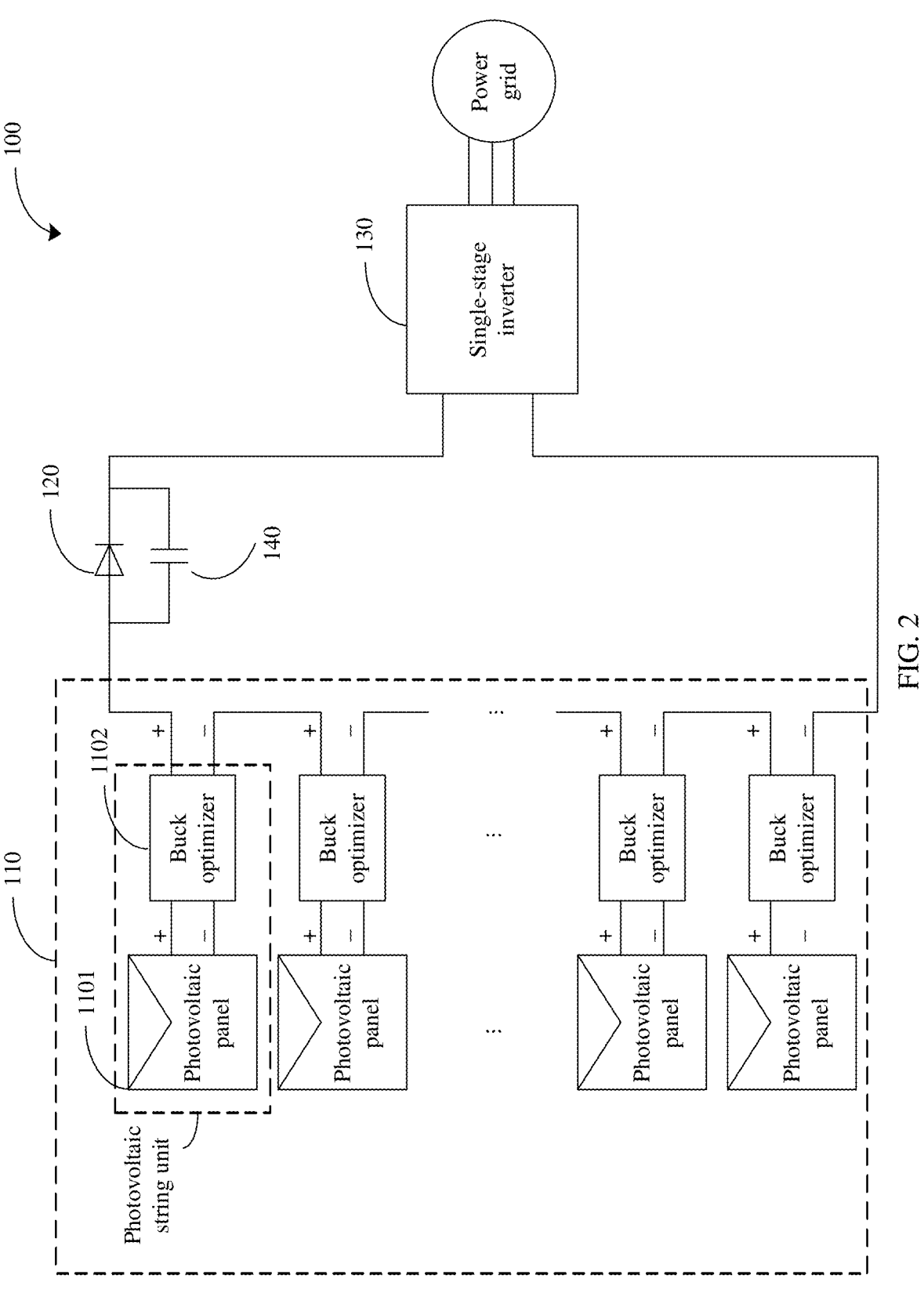
FIG. 2 is a schematic diagram of a photovoltaic power generation system including a single photovoltaic string according to an embodiment.

FIG. 2 is another schematic diagram of a photovoltaic power generation system according to an embodiment. The photovoltaic power generation system shown in FIG. 2 includes a plurality of photovoltaic string units connected in series. As shown in FIG. 2, the plurality of photovoltaic string units is connected in series, and each photovoltaic string unit includes a photovoltaic panel 1101 and a buck optimizer 1102. An input end of the buck optimizer 1102 is connected to output ends of one or more photovoltaic panels 1101. The buck optimizer 1102 may be configured to perform buck processing on an output voltage of the connected photovoltaic panel 1101.

A positive output end of a photovoltaic string 110 is connected to a positive input end of a single-stage inverter 130 through an anti-backflow circuit 120. The photovoltaic string 110 and the anti-backflow circuit 120 form a branch circuit. A negative output end of the photovoltaic string 110 is connected to a negative input end of the single-stage inverter 130. An output end of the single-stage inverter 130 is connected to a power grid.

The buck optimizer 1102 may be configured to control a voltage and a current that are output by the photovoltaic panel 1101 and has a maximum power tracking (MPPT) function. The single-stage inverter 130 is connected to the power grid and is configured to: convert a direct-current voltage from the photovoltaic string 110 into an alternating-current voltage and transfer the alternating-current voltage to the power grid. The anti-backflow circuit 120 is connected in series between the photovoltaic string 110 and the single-stage inverter 130 and is configured to prevent a current from flowing back from the single-stage inverter 130 to the photovoltaic string 110.

The anti-backflow circuit 120 may be the anti-backflow diode in FIG. 1 or may be a component with a same or similar function, such as a fuse or an electronic switch. This is not limited in this embodiment.

Optionally, the photovoltaic power generation system further includes a transmission path used to transfer a communication signal between the buck optimizer and the single-stage inverter. In other words, there is a communication connection relationship between the buck optimizer and the single-stage inverter. The communication signal may be, for example, a control signal or a data signal. This embodiment includes but is not limited thereto.

For example, the buck optimizer and the single-stage inverter may communicate with and connected to each other by using a PLC technology, a controller area network (CAN) bus, a recommended standard (RS)-485 bus, and the like. This embodiment includes but is not limited thereto.

The communication signal may be a PLC signal. In other words, the buck optimizer and the single-stage inverter may communicate with and connected to each other by using a PLC technology. The transmission path used to implement the communication connection may be, for example, a coupling capacitor.

FIG. 2 shows an example of a power line carrier communication technology used between the buck optimizer and the single-stage inverter. As shown in the figure, a coupling capacitor 140 is connected in parallel at two ends of the anti-backflow circuit 120. Because impedance of the coupling capacitor 140 to a direct-current voltage is infinite, and impedance to a high-frequency signal in power line carrier communication is very small, the coupling capacitor 140 may be used as a transmission path in power line carrier communication.

It should be understood that, regardless of a type of a used anti-backflow circuit, when the buck optimizer and the single-stage inverter communicate with each other by using a power line carrier communication technology, both ends of the anti-backflow circuit may be connected in parallel to the coupling capacitor as a signal path for power line carrier communication.

It should be further understood that the coupling capacitor may also be replaced with another component that can be used to implement direct current blocking and alternating current conducting, to transmit a PLC signal between the buck optimizer and the single-stage inverter.

Based on the foregoing photovoltaic power generation system, an output voltage can be controlled without a boost circuit. In one aspect, sufficient photovoltaic panels are connected in series, and each photovoltaic panel shares a low voltage; and therefore, when a small part of photovoltaic panels cannot work normally, an overall output voltage is not affected significantly. In another aspect, the buck optimizer has the MPPT function, and when some photovoltaic panels cannot work normally, an output voltage and an output current of another photovoltaic panel may be adjusted, to ensure that an overall voltage of the photovoltaic string keeps stable. Therefore, although the boost circuit is not used in the photovoltaic power generation system provided in this embodiment, a stable voltage can also be output, to achieve good system efficiency.

A working process of the entire photovoltaic power generation system performed when some photovoltaic modules cannot work normally is described in detail below.

For example, because a plurality of photovoltaic modules is connected in series, currents flowing through the photovoltaic modules are the same. When one or more photovoltaic modules in the photovoltaic power generation system cannot work normally due to blocking or another reason, an output power corresponding to the photovoltaic module may be reduced, overall output power of the photovoltaic string is also reduced accordingly, and an output voltage is reduced. The output voltage of the photovoltaic string is connected to the single-stage inverter. However, the single-stage inverter controls the input voltage within a stable range. Therefore, when detecting that the voltage decreases, the single-stage inverter reduces active power of grid connection, to reduce a current, so that the buck optimizer increases a corresponding output voltage of a photovoltaic module that is not blocked.

Structures and working principles of the buck optimizer and the single-stage inverter in the photovoltaic power generation system 100 are described below with reference to the accompanying drawings.

Figure 3:
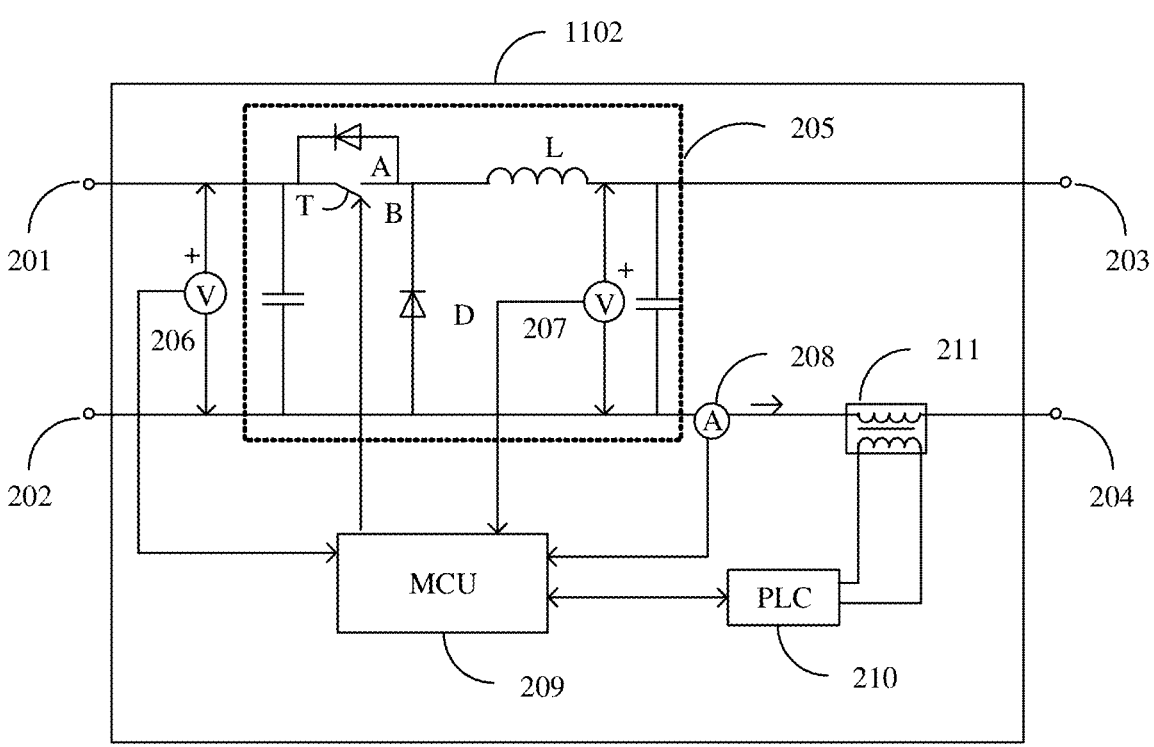
FIG. 3 is a schematic diagram of a structure of a buck optimizer according to an embodiment.

FIG. 3 is a schematic diagram of a structure of the buck optimizer 1102 according to an embodiment. A structure and a principle of the buck optimizer are described below with reference to FIG. 3.

As described above, an input end of the buck optimizer 1102 may be connected to output ends of one or more photovoltaic panels 1101. The buck optimizer 1102 may be configured to perform buck processing on an output voltage of the connected photovoltaic panel 1101.

The buck optimizer 1102 includes two input ends 201 and 202 and two output ends 203 and 204. The input ends 201 and 202 are respectively configured to connect to a positive electrode and a negative electrode of the photovoltaic panel. After an input voltage of the photovoltaic panel enters the buck optimizer, the buck optimizer 1102 may perform buck processing on the input voltage by using a buck circuit 205. The output ends 203 and 204 may output a voltage obtained after the buck processing to a single-stage inverter.

It should be understood that, for ease of description, FIG. 3 shows a circuit structure of the buck optimizer only by using a buck circuit as the buck circuit. In actual application, another buck circuit, for example, a three-level buck circuit, may also be used. This embodiment includes but is not limited thereto.

A voltmeter 206 is connected in parallel between the input ends 201 and 202 of the buck optimizer 1102 and is configured to collect an input voltage of a photovoltaic string unit, that is, an input voltage of the one or more photovoltaic panels connected to the buck optimizer 1102. A voltmeter 207 is further connected in parallel between the output ends 203 and 204 of the buck optimizer 1102 and is configured to collect an output voltage of the buck optimizer 1102.

In addition, the output end 204 is further connected in series to an ammeter 208, and the ammeter 208 is configured to collect an output current of the buck optimizer 102 and a current value of a backflow current.

The buck optimizer 1102 further includes a control unit 209. The control unit 209 shown in the figure is a micro control unit (MCU). The voltmeter 206, the voltmeter 207, and the ammeter 208 may all be connected to the control unit 209 and are configured to feed back the collected input voltage, output voltage, and output current to the control unit 209, so that the control unit 209 controls a buck circuit 205 based on collected data.

The control unit 209 is connected to a switching transistor T in the buck circuit, and the switching transistor T may respond to a pulse control signal from the control unit 209, to control the buck circuit.

The switching transistor T may be a metal-oxide-semiconductor field-effect transistor (MOSFET), and the metal-oxide-semiconductor field-effect transistor is referred to as a MOS transistor for short; or the switching transistor T may be an insulated gate bipolar transistor (IGBT). This embodiment includes, but is not limited thereto.

It should be understood that for a circuit structure of the buck circuit, refer to a conventional technology. For brevity, details are not described herein.

In this embodiment, the control unit 209 may control on/off of the switching transistor T by sending a pulse control signal to the switching transistor T, to control an input voltage, an output voltage, an output current, and output power. When the switching transistor T is turned on, the input end 201 of the buck optimizer 1102 is connected to a point A, and for an equivalent circuit diagram of a corresponding buck circuit, refer to (a) in FIG. 4. When the switching transistor T is turned off, the input end 201 of the buck optimizer 1102 is connected to a point B, that is, the input end 201 is disconnected from an inductor L, and for an equivalent circuit diagram of a corresponding buck circuit, refer to (b) in FIG. 4.

A pulse width modulation (PWM) technology is used as an example below to describe a case in which on/off of the switching transistor T is controlled by using a pulse control signal. It should be understood that a PWM signal is merely an example of the pulse control signal and shall not constitute any limitation on this embodiment.

The control unit 209 adjusts a duty cycle of the PWM signal based on the detected input voltage (that is, the output voltage of the photovoltaic string unit), the output voltage, and the output current of the buck circuit, to control on/off duration of the switching transistor T in the buck circuit, control the output voltage and the output current, and obtain a maximum output power point based on the output voltage and the output current.

It should be understood that, through changing of the duty cycle of the PWM signal, an average value of the output voltage of the buck circuit may be less than an average value of the input voltage, to implement a buck function. A control unit may input the PWM signal to a switching transistor in the buck circuit, to control on/off duration of the switching transistor in the buck circuit, so as to control an output voltage of the buck circuit.

Figure 4:
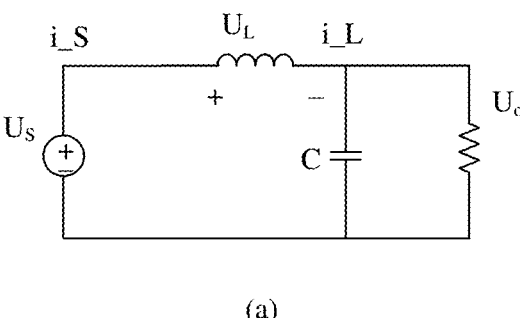
FIG. 4 is a schematic diagram of equivalent circuit diagrams used when a buck circuit is turned on and off according to an embodiment.
Figure 4:
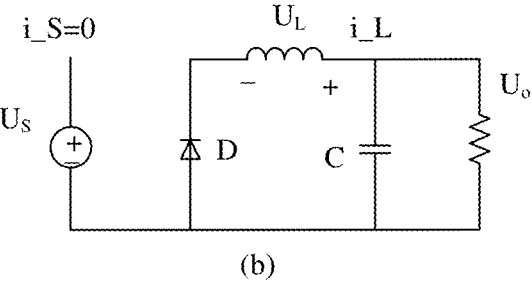

For example, (a) in FIG. 4 shows an equivalent circuit diagram of a buck circuit obtained after the switching transistor is turned on to the point A when the PWM signal is at a high level. With reference to FIG. 3, when the switching transistor is turned on, an anode voltage of a buck diode D is zero, and a cathode is a voltage Us generated by the photovoltaic module. Therefore, the buck diode D is reversely cut off, and a current i_S that is generated by the photovoltaic string and that flows through the switching transistor supplies power to the subsequent single-stage inverter through the inductor L. In this case, a current i_L in the inductor L gradually increases, and self-induced electromotive force UL with a positive value on the left and a negative value on the right is generated at two ends of the inductor to prevent the current from rising. The inductor L converts electric energy into magnetic energy and stores the magnetic energy.

After a period of time, the PWM signal changes to a low level, and the switching transistor is disconnected. (b) in FIG. 4 shows an equivalent circuit diagram of the buck circuit obtained when the switching transistor is disconnected. It should be understood that, that the switching transistor T is disconnected from the point A means that the switching transistor is connected to the point B. In (b) in FIG. 4, the self-induced electromotive force with a positive value on the left and a negative value on the right is generated at the two ends of the inductor to prevent the current from decreasing, so that the buck diode D is positively turned on. Therefore, the current i_L in the inductor L flows through the buck diode D to form a closed loop, and a current value gradually decreases. The inductor L converts magnetic energy into electric energy and releases the electric energy to supply power to a subsequent power grid, and a corresponding output voltage in (b) in FIG. 4 is $U_o$.

After a period of time, the PWM signal is a high-level signal, and the foregoing process is repeated to control the output current and the output voltage of the buck circuit.

In addition, as described above, the photovoltaic power generation system further includes a transmission path used for transmitting a communication signal between the buck optimizer 1102 and the single-stage inverter 130, such as the foregoing coupling capacitor 140 for implementing PLC. Correspondingly, the buck optimizer 1102 may further include a first PLC control unit 210 and a first PLC coupling transformer 211. One end of the first PLC control unit 210 communicates with the control unit 209 of the buck optimizer, and the other end communicates with the single-stage inverter 130 by using the first PLC coupling transformer 211.

The first PLC coupling transformer 211 may be used as a physical carrier of a PLC signal, and is configured to inject a communication signal from the first PLC control unit 210 into a power line, to send the communication signal to the single-stage inverter 130 by using the PLC technology, or is configured to extract a communication signal from a power line, to send the communication signal to the first PLC control unit 210.

The buck optimizer 1102 may implement communication with the single-stage inverter 130.

Figure 5:
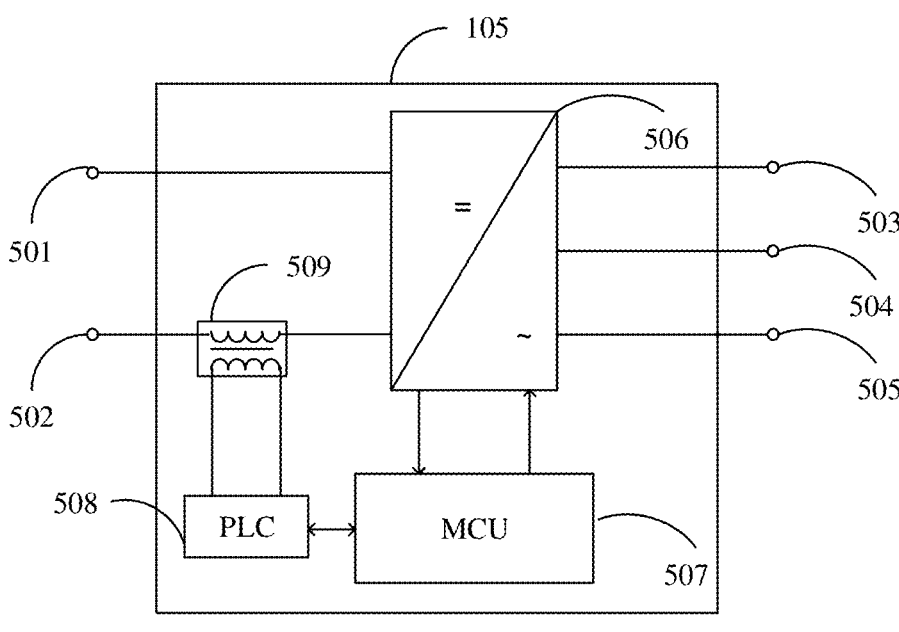
FIG. 5 is a schematic diagram of a structure of a single-stage inverter according to an embodiment.

FIG. 5 is a schematic diagram of a structure of the single-stage inverter 130 according to an embodiment. A structure and a principle of the single-stage inverter are described below with reference to FIG. 5.

The single-stage inverter 130 includes two input ends 501 and 502 and three output ends 503, 504, and 505. The input ends 501 and 502 are respectively configured to connect to a positive electrode and a negative electrode of a photovoltaic string. After an input voltage of the photovoltaic string enters the single-stage inverter 130, the single-stage inverter 130 may convert the input voltage from a direct-current voltage into an alternating-current voltage by using a DC-AC converter 506. The output ends 503, 504, and 505 may output a converted voltage to a power grid.

It should be understood that the DC-AC converter in FIG. 5 is merely an example. For a circuit structure of the DC-AC converter, refer to a conventional technology. For brevity, details are not described herein.

The single-stage inverter 130 further includes a second control unit 507. The second control unit 507 shown in FIG. 5 is an MCU. The second control unit 507 may obtain an input signal from the DC-AC converter 506 and may also output a control signal to the DC-AC converter 506, to implement grid connection power control over the single-stage inverter 130. The single-stage inverter 130 can further control the input voltage to be stable within a range by adjusting a grid connection current or active power. Grid connection power is power that is input by the single-stage inverter 130 to the power grid, and the grid connection current is a current flowing through the photovoltaic string 110.

In addition, as described above, the photovoltaic power generation system further includes a transmission path used for transmitting a communication signal between the buck optimizer 1102 and the single-stage inverter 130, such as the foregoing coupling capacitor 140 for implementing PLC. Correspondingly, the single-stage inverter 130 may further include a second PLC control unit 508 and a second PLC coupling transformer 509. One end of the second PLC control unit 508 communicates with the second control unit 507 of the single-stage inverter 130, and the other end communicates with the buck optimizer 1102 by using the second PLC coupling transformer 509.

It should be understood that a function of the second power line carrier communication coupling transformer is the same as a function of the first power line carrier communication coupling transformer. Details are not described herein again.

The single-stage inverter 130 may implement communication with the buck optimizer 1102.

The foregoing photovoltaic power generation system includes the buck optimizer, the single-stage inverter, and the anti-backflow circuit. Compared with another photovoltaic power generation system in a conventional technology, one stage of DC/DC converter is reduced, and therefore, a structure is simple, and costs are low. In addition, communication between the buck optimizer and the single-stage inverter is implemented in a power line carrier communication manner, so that a line is simplified, and reliability of signal transmission is improved. In addition, the photovoltaic module is connected to an optimizer with the MPPT function to implement component-level maximum power tracking and convert an input voltage/current into different output voltages/currents, so that system efficiency is improved to maximum extent.

It should be understood that the photovoltaic power generation system provided in FIG. 2 shows only a photovoltaic power generation system including one photovoltaic string. In an actual case, a photovoltaic power generation system including a plurality of photovoltaic strings may also be used. For ease of understanding, a photovoltaic power generation system including a plurality of photovoltaic strings is described below with reference to FIG. 6.

Figure 6:
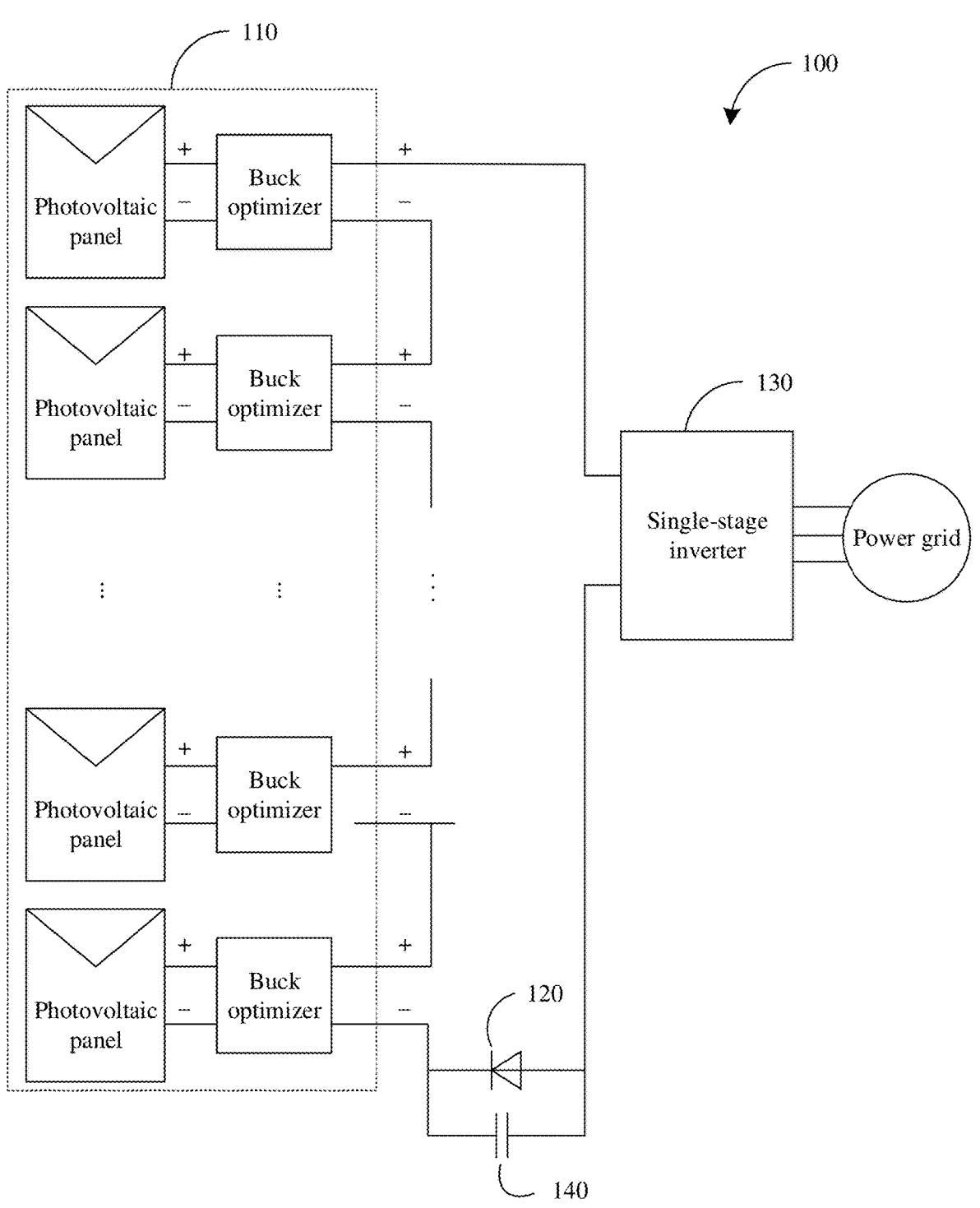
FIG. 6 is another schematic diagram of a photovoltaic power generation system including a single photovoltaic string according to an embodiment.

FIG. 6 is another schematic diagram of a photovoltaic power generation system according to an embodiment. A photovoltaic power generation system 100 includes a photovoltaic string 110, an anti-backflow circuit 120, a single-stage inverter 130, and a coupling capacitor 140. A difference between this figure and FIG. 1 lies in the following: Both the anti-backflow circuit 120 and the coupling capacitor 140 in this figure are connected in series between a negative output end of the photovoltaic string and a negative input end of the single-stage inverter, and a positive output end of the photovoltaic string is connected to a positive input end of the single-stage inverter. For a connection relationship between other parts and a function of each part, refer to related descriptions in FIG. 1. Details are not described herein again.

Figure 7:
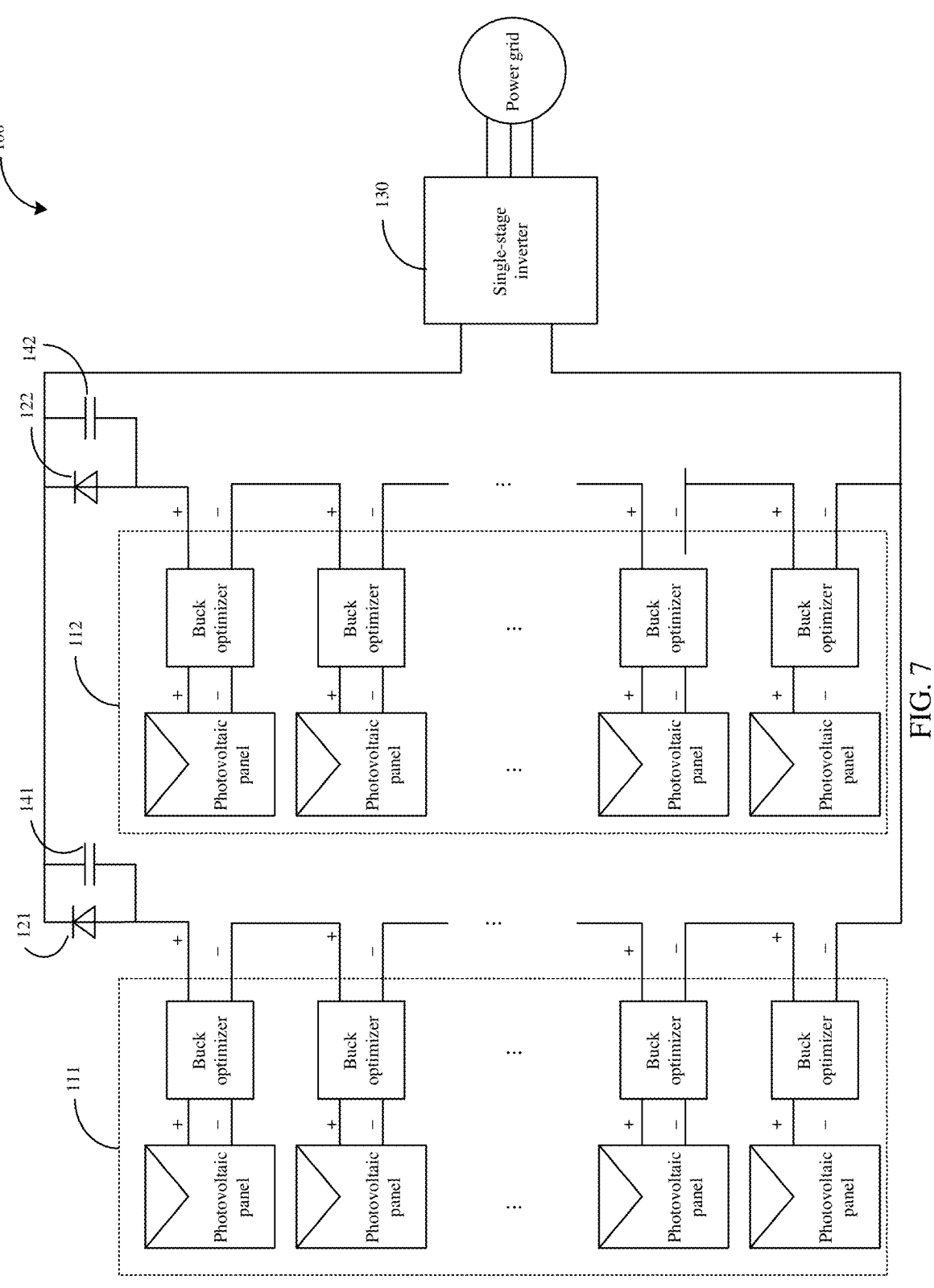
FIG. 7 is a schematic diagram of a photovoltaic power generation system including a plurality of photovoltaic strings according to an embodiment.

FIG. 7 is another schematic diagram of a photovoltaic power generation system according to an embodiment. A photovoltaic power generation system 100 shown in FIG. 7 includes two photovoltaic strings 111 and 112, and positive output ends of the two photovoltaic strings are respectively connected in series to anti-backflow circuits 121 and 122, to form two branch circuits. The two branch circuits are connected in parallel to a single-stage inverter 130. Each photovoltaic string may include a plurality of photovoltaic string units, and each photovoltaic string unit includes a buck optimizer and one or more photovoltaic panels connected to the buck optimizer. For related descriptions of the photovoltaic string, refer to the foregoing related descriptions of the photovoltaic string. For brevity, details are not described herein again.

The photovoltaic string 111 may be connected in series to the anti-backflow circuit 121. The anti-backflow circuit 121 may be configured to prevent a current from flowing back from the single-stage inverter 130 to the photovoltaic string 111 and may also be configured to prevent a current from flowing back from the photovoltaic string 112 to the photovoltaic string 111, to protect the photovoltaic string 111. A coupling capacitor 141 may be connected in parallel to two ends of the anti-backflow circuit 121, so that communication between a buck optimizer in the photovoltaic string 111 and the single-stage inverter is implemented by using the coupling capacitor 141.

The photovoltaic string 112 is connected in series to the anti-backflow circuit 122. The anti-backflow circuit 122 may be configured to prevent a current from flowing back from the single-stage inverter 130 to the photovoltaic string 112 and may also be configured to prevent a current from flowing back from the photovoltaic string 111 to the photovoltaic string 112, to protect the photovoltaic string 112. A coupling capacitor 142 may also be connected in parallel to two ends of the anti-backflow circuit 122, so that communication between a buck optimizer in the photovoltaic string 112 and the single-stage inverter is implemented by using the coupling capacitor 142.

The photovoltaic string 111 and the anti-backflow circuit 121 that are connected in series may form a first branch circuit, the photovoltaic string 112 and the anti-backflow circuit 122 that are connected in series may form a second branch circuit, and both the first branch circuit and the second branch circuit may be connected in parallel to the single-stage inverter 130. An output end of the single-stage inverter 130 is connected to a power grid.

It should be understood that in the photovoltaic power generation system shown in FIG. 7, each branch circuit has one anti-backflow circuit, and the anti-backflow circuit is not only configured to prevent a current from flowing back from the single-stage inverter 130 to a photovoltaic string connected to the branch circuit, but is also configured to prevent a current from flowing back from another branch circuit to a photovoltaic string connected to the branch circuit, to protect a photovoltaic string in the branch circuit.

The anti-backflow circuit 121 in the first branch circuit may be configured to prevent a current from flowing back from the single-stage inverter 130 to the photovoltaic string 111 and may also be configured to prevent a current from flowing back from the second branch circuit to the photovoltaic string 111, to protect the photovoltaic string 111. Similarly, the anti-backflow circuit 122 in the second branch circuit may be configured to prevent a current from flowing back from the single-stage inverter 130 to the photovoltaic string 112 and may also be configured to prevent a current from flowing back from the first branch circuit to the photovoltaic string 112, to protect the photovoltaic string 112. It should be further understood that FIG. 7 shows only an example of a photovoltaic power generation system including two branch circuits for ease of understanding. However, this shall not constitute any limitation on this embodiment. The photovoltaic power generation system may further include more similar branch circuits, and photovoltaic strings in the branch circuits may include a same quantity of photovoltaic string units or different quantities of photovoltaic string units. This is not limited in this embodiment.

Figure 8:
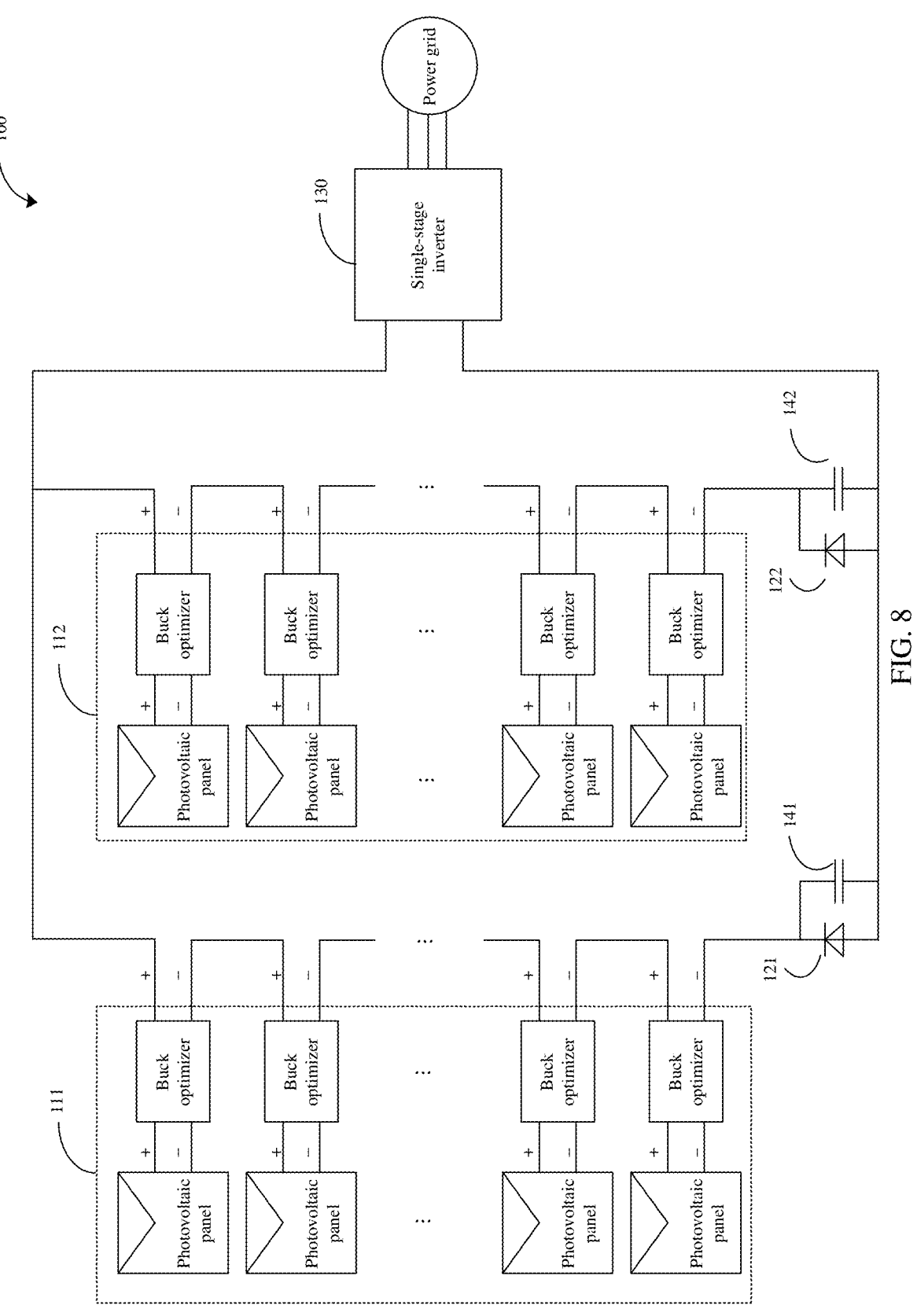
FIG. 8 is another schematic diagram of a photovoltaic power generation system including a plurality of photovoltaic strings according to an embodiment.

FIG. 8 is another schematic diagram of a photovoltaic power generation system according to an embodiment. A difference between the photovoltaic power generation system shown in FIG. 8 and the photovoltaic system shown in FIG. 7 lies in the following: Anti-backflow circuits 121 and 122 are respectively connected in series to negative output ends of two photovoltaic strings 111 and 112, and corresponding coupling capacitors 141 and 142 are respectively connected in parallel to two ends of the anti-backflow circuits 121 and 122. For a connection relationship between other parts and a function of each part, refer to related descriptions in FIG. 7. Details are not described herein again.

Figure 9:
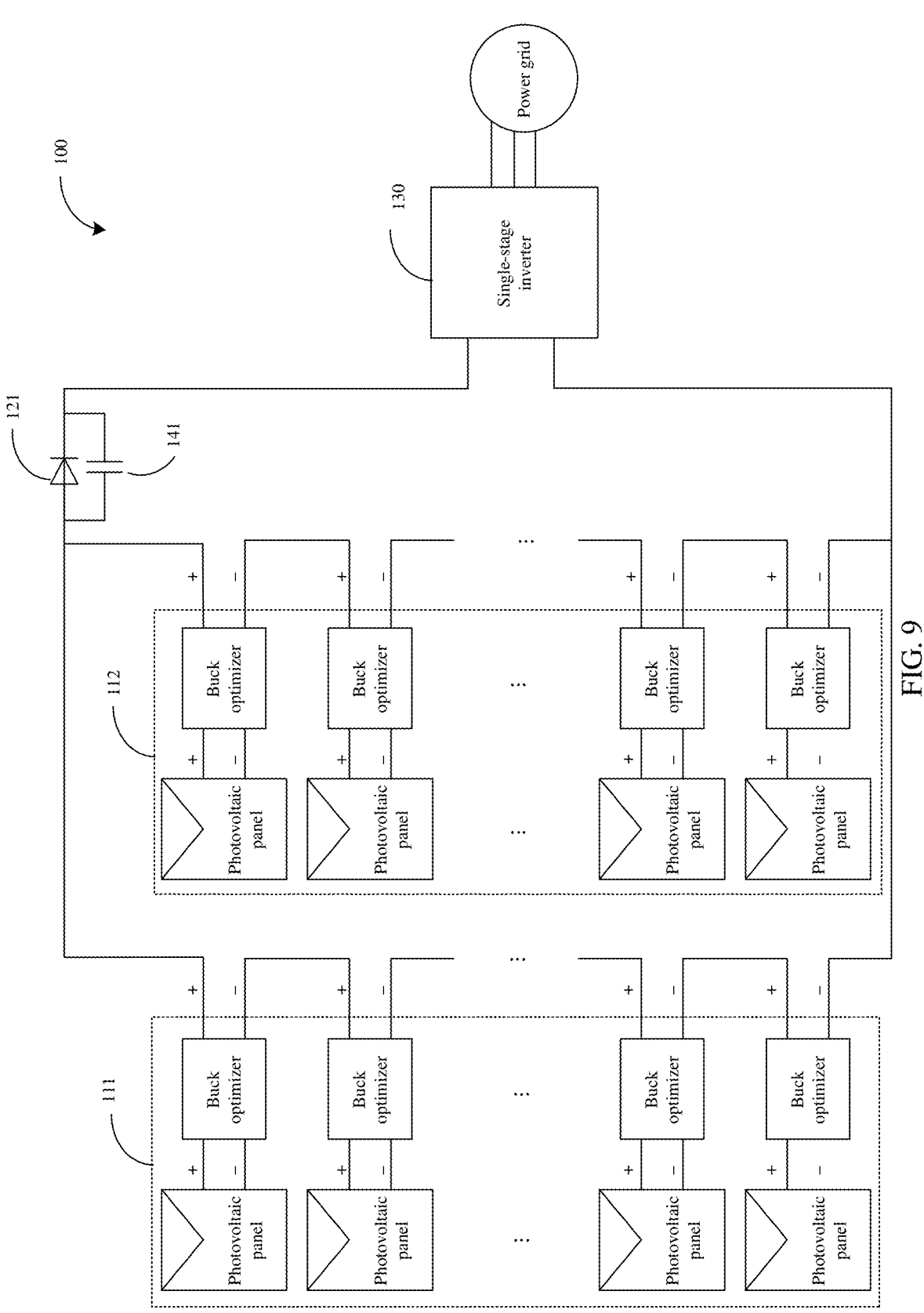
FIG. 9 is still another schematic diagram of a photovoltaic power generation system including a plurality of photovoltaic strings according to an embodiment.

FIG. 9 is still another schematic diagram of a photovoltaic power generation system according to an embodiment. A difference from the photovoltaic system including a plurality of photovoltaic strings in FIG. 7 lies in that the photovoltaic power generation system in FIG. 9 uses a form in which a plurality of photovoltaic strings is connected in parallel and then connected in series to one anti-backflow circuit.

A photovoltaic power generation system 100 shown in FIG. 9 includes two photovoltaic strings 111 and 112. The two photovoltaic strings are connected in parallel, and the two photovoltaic strings connected in parallel are connected in series to an anti-backflow circuit 121 and are connected in parallel to a single-stage inverter 130. Each photovoltaic string may include a plurality of photovoltaic string units, and each photovoltaic string unit includes a buck optimizer and one or more photovoltaic panels connected to the buck optimizer. For related descriptions of the photovoltaic string, refer to the foregoing related descriptions of the photovoltaic string. For brevity, details are not described herein again.

The photovoltaic string 111 and the photovoltaic string 112 may be connected in parallel, and the two photovoltaic strings are connected in parallel and then connected in series to the anti-backflow circuit 121. The anti-backflow circuit 121 is an example of a first anti-backflow circuit. The anti-backflow circuit 121 may be configured to prevent a current from flowing back from the single-stage inverter 130 to the photovoltaic string 111 and the photovoltaic string 112, to protect the photovoltaic string 111 and the photovoltaic string 112. A coupling capacitor 141 may be connected in parallel to two ends of the anti-backflow circuit 121, so that communication between the single-stage inverter and buck optimizers in the photovoltaic string 111 and the photovoltaic string 112 is implemented by using the coupling capacitor 141.

Photovoltaic strings 111 connected in series may form a first branch circuit, and photovoltaic strings 112 connected in series may form a second branch circuit. Output ends of the first branch circuit and the second branch circuit that are connected in parallel are connected in series to an anti-backflow circuit and are then connected in parallel to the single-stage inverter 130. An output end of the single-stage inverter 130 is connected to a power grid.

It should be further understood that FIG. 9 shows only an example of a photovoltaic power generation system including two branch circuits for ease of understanding. However, this shall not constitute any limitation on this embodiment. The photovoltaic power generation system may further include more similar branch circuits, and photovoltaic strings in the branch circuits may include a same quantity of photovoltaic string units or different quantities of photovoltaic string units. This is not limited in this embodiment.

Figure 10:
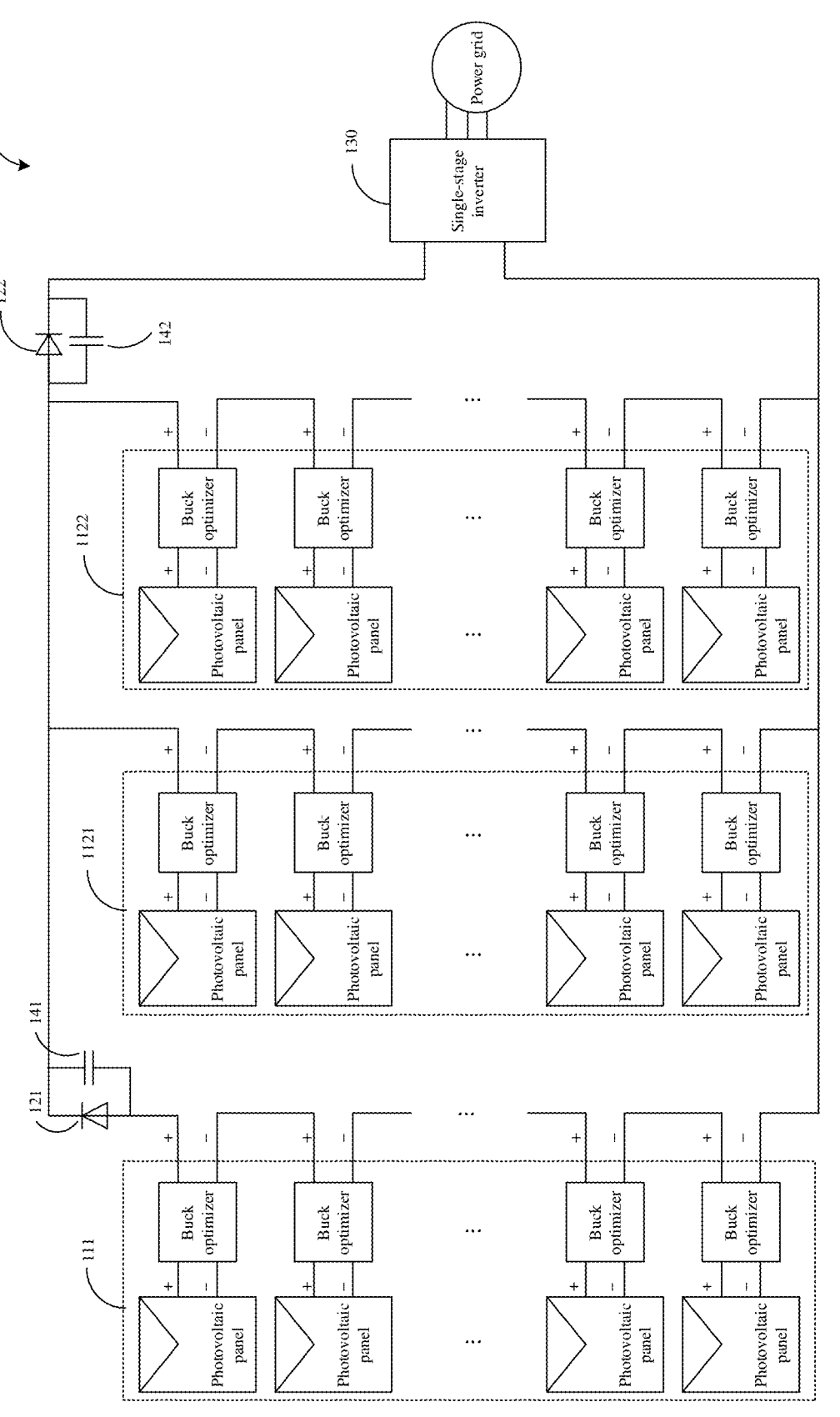
FIG. 10 is yet another schematic diagram of a photovoltaic power generation system including a plurality of photovoltaic strings according to an embodiment.

FIG. 10 is yet another schematic diagram of a photovoltaic power generation system according to an embodiment. FIG. 10 is a schematic diagram including a plurality of photovoltaic strings obtained based on FIG. 7 and FIG. 9, including a structure in which a single photovoltaic string is connected in series to one anti-backflow circuit and a structure in which a plurality of photovoltaic strings is connected in series to one anti-backflow circuit.

A photovoltaic power generation system 100 shown in FIG. 10 includes three photovoltaic strings 111, 1121, and 1122. The photovoltaic string 111 is connected in series to an anti-backflow circuit 121 to form a first branch circuit. After being connected in parallel, the photovoltaic string 1121 and the photovoltaic string 1122 are connected in series to an anti-backflow circuit 122 to form a second branch circuit. Both the first branch circuit and the second branch circuit may be connected in parallel to a single-stage inverter 130. The anti-backflow circuit 122 is connected in series to two photovoltaic strings 1121 and 1122 and may be considered as another example of a first anti-backflow circuit.

It should be understood that FIG. 10 is used to describe a case in which the photovoltaic power generation system provided in this embodiment may include a structure in which a single photovoltaic string is connected in series to one anti-backflow circuit, or may include a structure in which a plurality of photovoltaic strings is connected in series to one anti-backflow circuit. For detailed content of other parts, refer to the foregoing related descriptions. For brevity, details are not described herein again.

Therefore, in the photovoltaic power generation system provided in this embodiment, a photovoltaic string including the photovoltaic panel and the buck optimizer is used together with the single-stage inverter, and a boost circuit is canceled. Compared with another photovoltaic power generation system in a conventional technology, one-stage of DC/DC conversion is reduced, and therefore, a structure is simple, and costs are low. In addition, the photovoltaic module is connected to an optimizer with the MPPT function to implement component-level maximum power tracking and convert an input voltage/current into different output voltages/currents, so that system efficiency is improved to maximum extent. In addition, the anti-backflow circuit is added between the photovoltaic string and the single-stage inverter, so that current backflow can be prevented, and the photovoltaic string can be protected, to avoid damage to the photovoltaic string.

It should be understood that for structures and functions of the photovoltaic string, the photovoltaic panel, the buck optimizer, the single-stage inverter, the anti-backflow circuit, and the coupling capacitor in FIG. 6 to FIG. 10, refer to the foregoing related descriptions. For brevity, details are not described herein again.

FIG. 2 and FIG. 6 to FIG. 10 separately show that the photovoltaic power generation system in embodiments is a photovoltaic power generation system that uses the buck optimizer, the anti-backflow circuit, and the single-stage inverter. It should be noted that in any photovoltaic power generation system shown in FIG. 2 and FIG. 6 to FIG. 10, there may be at least one photovoltaic string and at least one anti-backflow circuit. A quantity of photovoltaic strings and a quantity of anti-backflow circuits in FIG. 2 and FIG. 6 to FIG. 10 are merely examples and shall not constitute a limitation on this embodiment.

Embodiments above are described to enable a person skilled in the art to implement or use the embodiments. Various modifications made to embodiments are obvious to a person skilled in the art, and the general principles defined herein may also be implemented in other embodiments without departing from the scope of the embodiments. Therefore, is the embodiments are not intended to be limited to these embodiments illustrated herein, but shall be construed in the widest scope consistent with the principles and novel features herein.

The photovoltaic power generation system provided in the embodiments is described in detail above. A principle and an implementation are described in the embodiments by using examples. The descriptions about the foregoing embodiments are merely provided to help understand the method. In addition, a person of ordinary skill in the art may make changes to the implementation. Therefore, content herein shall not be construed as a limitation or limiting. Although described in detail with reference to the foregoing embodiments, persons of ordinary skill in the art should understand that they may still make modifications to without departing from the scope of the solutions of the embodiments.

What is claimed is:

1. A photovoltaic power generation system, comprising:
a single-stage inverter;
at least one anti-backflow circuit;
at least one photovoltaic string; and
a coupling capacitor, wherein each of the at least one anti-backflow circuit is connected to one input end of the single-stage inverter, one output end of each of the at least one photovoltaic string is connected to the other input end of the single-stage inverter, and the other output end of each photovoltaic string is connected to one of the at least one anti-backflow circuit;
each photovoltaic string comprises a plurality of photovoltaic string units, each of the plurality of photovoltaic string units comprises a buck optimizer and one or more photovoltaic panels connected in parallel to the buck optimizer, and the buck optimizer is configured to perform buck processing on an output voltage or output voltages of the connected one or more photovoltaic panels;
the single-stage inverter is connected to a power grid and is configured to:
convert a direct-current voltage from the photovoltaic string into an alternating-current voltage and transfer the alternating-current voltage to the power grid;
the anti-backflow circuit is configured to prevent a backflow current from flowing back to one or more of the at least one photovoltaic string; and
the coupling capacitor is connected in parallel to two ends of the anti-backflow circuit and is configured to transmit a signal between each buck optimizer in the at least one photovoltaic string and the single-stage inverter, to control backflow of the backflow current when the anti-backflow circuit fails.

2. The photovoltaic power generation system according to claim 1, wherein a first buck optimizer in a first photovoltaic string in the plurality of photovoltaic strings is configured to send a first power line communication (PLC) signal to the single-stage inverter when detecting a backflow current that is greater than or equal to a first preset threshold, the first PLC signal carries a value of the backflow current, the first photovoltaic string is one or more photovoltaic strings in the at least one photovoltaic string, and the first buck optimizer is any buck optimizer in the first photovoltaic string; and the single-stage inverter is further configured to reduce a bus voltage when receiving the first PLC signal.

3. The photovoltaic power generation system according to claim 2, wherein the single-stage inverter is further configured to turn off the single-stage inverter when the bus voltage is reduced to a second preset threshold, but the backflow current is still greater than or equal to the first preset threshold.

4. The photovoltaic power generation system according to claim 3, further comprising:
a second photovoltaic string, wherein the single-stage inverter is further configured to: before turning off the single-stage inverter, send a second PLC signal to a buck optimizer in the second photovoltaic string when the bus voltage is reduced to the second preset threshold but the backflow current is still greater than or equal to the first preset threshold, and the second PLC signal carries an output voltage reduction instruction,
and the second buck optimizer is any buck optimizer in the second photovoltaic string.

5. The photovoltaic power generation system according to claim 2, wherein each buck optimizer comprises a first PLC control unit and a first PLC coupling transformer.

6. The photovoltaic power generation system according to claim 2, wherein the single-stage inverter comprises a second PLC control unit and a second PLC coupling transformer, the second PLC control unit is configured to generate a PLC signal.

7. The photovoltaic power generation system according to claim 1, wherein each of the at least one anti-backflow circuit is connected in series to one of the at least one photovoltaic string to form a branch circuit, and at least one branch circuit comprising the at least one anti-backflow circuit and the at least one photovoltaic string is connected in parallel to the single-stage inverter.

8. The photovoltaic power generation system according to claim 1, wherein a first anti-backflow circuit in the at least one anti-backflow circuit is connected to a plurality of photovoltaic strings, the plurality of photovoltaic strings are connected in parallel, one output end of the plurality of photovoltaic strings is connected to the first anti-backflow circuit, and the other output end of the plurality of photovoltaic strings is connected to the single-stage inverter.

9. The photovoltaic power generation system according to claim 7, wherein a positive electrode of each of the at least one photovoltaic string is connected to one anti-backflow circuit and a negative electrode is connected to the single-stage inverter.

10. The photovoltaic power generation system according to claim 1, wherein the at least one anti-backflow circuit comprises an anti-backflow diode.

11. The photovoltaic power generation system according to claim 1, wherein the at least one anti-backflow circuit comprises a fuse.

12. The photovoltaic power generation system according to claim 1, wherein the at least one anti-backflow circuit comprises an electronic switch.

13. The photovoltaic power generation system according to claim 1, wherein the backflow current comprises a current generated when a bus voltage is greater than an open-circuit voltage of the at least one photovoltaic string.

14. The photovoltaic power generation system according to claim 1, wherein the backflow current comprises a current generated when the photovoltaic power generation system comprises a plurality of photovoltaic strings and open-circuit voltages of the plurality of photovoltaic strings are different.

15. The photovoltaic power generation system according to claim 5, wherein the first PLC control unit is configured to generate a PLC signal, and the first PLC coupling transformer is configured to couple the PLC signal to a power line.

16. The photovoltaic power generation system according to claim 5, wherein the first PLC coupling transformer is configured to extract the PLC signal from a power line and send the PLC signal to the first PLC control unit.

17. The photovoltaic power generation system according to claim 6, wherein the second PLC coupling transformer is configured to couple the PLC signal to a power line.

18. The photovoltaic power generation system according to claim 6, wherein the second PLC coupling transformer is configured to extract the PLC signal from a power line and send the PLC signal to the second PLC control unit.

19. The photovoltaic power generation system according to claim 7, wherein a negative electrode of each of the at least one photovoltaic string is connected to one anti-backflow circuit and a positive electrode is connected to the single-stage inverter.

20. The photovoltaic power generation system according to claim 4, wherein a second buck optimizer in the second photovoltaic string is either configured to reduce an output voltage or turn off the second buck optimizer when receiving the second PLC signal.

* * * * *